United States Patent [19]

Swarr et al.

[11] Patent Number: 4,800,052

[45] Date of Patent: Jan. 24, 1989

[54] METHOD OF FABRICATING MOLTEN CARBONATE CATHODES

[75] Inventors: Thomas E. Swarr, South Windsor; John C. Trocciola, Glastonbury, both of Conn.

[73] Assignee: International Fuel Cells Corporation, South Windsor, Conn.

[21] Appl. No.: 943,232

[22] Filed: Dec. 17, 1986

Related U.S. Application Data

[62] Division of Ser. No. 812,218, Dec. 23, 1986, Pat. No. 4,708,917.

[51] Int. Cl.⁴ ............................................. C04B 35/64
[52] U.S. Cl. .......................................... 264/65; 264/66
[58] Field of Search ................................... 264/66, 65

[56] References Cited

U.S. PATENT DOCUMENTS

| | | | |
|---|---|---|---|
| 2,914,596 | 11/1959 | Gorin et al. | 136/86 |
| 3,268,365 | 8/1966 | McQuade et al. | |
| 3,969,139 | 7/1976 | Lai. | |
| 4,009,126 | 2/1977 | McFarland | 502/328 |
| 4,048,395 | 9/1977 | Lai. | |
| 4,199,522 | 4/1980 | Murchison et al. | 502/328 |
| 4,247,604 | 1/1981 | Marianowski et al. | |
| 4,386,040 | 5/1983 | Baumgartner | 264/56 |
| 4,483,694 | 11/1984 | Takamura et al. | 55/68 |

FOREIGN PATENT DOCUMENTS 55-19043 5/1980 Japan.

OTHER PUBLICATIONS

"Time Dependence of NiO–Li$_2$O Solid Solution Formation", by Yoshio Iida–Journal of the Ceramic Society Discussion & Notes, Jan. 1960.

"Fuel Cells With Molten–Carbonate Electrolytes", by Liebhafsky et al., J. Wiley, Chapter 12, Fuel Cells and Fuel Batteries, 1968, pp. 524–553.

Argonne National Laboratory Paper ANL-79-55, "Critical Survey on Electrode Aging in Molten Carbonate Fuel Cells", by K. Kinoshita–Dec. 1979.

CA Selects–Batteries & Fuel Cells, Issue 26, 1983, p. 6, Abstract 99:21587e, Molten–Carbonate Fuel Cell Cathode.

Primary Examiner—James Derrington

[57] ABSTRACT

Molten carbonate fuel cell cathodes formed from a composition comprising oxides of nickel, lithium salts and barium salts having improved strength. These cathodes are fabricated by prefiring oxides of nickel and optionally lithium salts. The prefired powder is optionally leached with an organic acid and optional barium salts may be added. These powders are formed into an electrode and sintered. The resulting electrodes have improved strength.

2 Claims, 2 Drawing Sheets

METHOD OF FABRICATING MOLTEN CARBONATE CATHODES

This is a division of application Ser. No. 812,218, filed on Dec. 23, 1986, now U.S. Pat. No. 4,708,917.

1. Technical Field

This disclosure relates to electrodes and methods for fabricating electrodes, particularly molten carbonate fuel cell cathodes.

2. Background Art

Molten carbonate fuel cells generally comprise two electrodes, a cathode and an anode, their current collectors, and an electrolyte matrix making contact with both electrodes. A cell housing is used to physically retain the cell components. Air and carbon dioxide are fed to the cathode where $CO_2$ is oxidized to form a carbonate ion.

$$CO_2 + \tfrac{1}{2}O_2 + 2e^- \rightleftharpoons CO_3^= \quad (1)$$

The carbonate ion diffuses through the electrolyte matrix to the anode where it reacts with the fuel gas.

$$H_2 + CO_3^= \rightleftharpoons H_2O + CO_2 + 2e^- \quad (2)$$

Hydrogen is consumed in the anode compartment, producing water, carbon dioxide, and electrons. The electrons flow to the cathode through an external circuit producing the desired current flow.

To maintain a high level of stable performance, both the electrolyte matrix and electrode structures must be engineered to optimize the gas-electrolyte-electrode interface. Electrode structures must be fabricated with controlled pore spectra since electrolyte fill of the electrodes is controlled by capillary forces. High porosities are desired to maximize electrode surface area and electrochemical activity; the maximum porosity is limited by the resulting strength of the structure. Pores must also be of the proper size. Large pores will limit the extent of electrolyte fill, reducing the amount of three phase interface and resulting in poor performance. Small pores will cause electrolyte flooding, resulting in high losses due to necessary diffusion of gaseous reactants through the electrolyte.

Conventional molten carbonate cathodes have been formed by the in-situ oxidation and lithiation of porous nickel structures. Porous nickel structures of this type can be produced by a variety of powder metallurgical techniques to form a green compact with voids between the particles forming interconnected pore channels throughout the compact. The green compact is then sintered by heating at temperatures of greater than about 70 percent of the melting point temperatures. This produces cathodes with interconnected particles and pore channels throughout the structure. When the fuel cell is heated to operating temperatures of 500° C. to 700° C., the carbonate electrolyte melts and wets the cathode structure. The nickel cathode is violently oxidized and lithiated. This in-situ oxidation disrupts the sintered structure, resulting in a weak structure with an uncontrolled pore spectra.

There has been an extensive search for methods of making pre-oxidized nickel cathodes with a known and controlled pore spectra and improved strength. E. Gorin et al (U.S. Pat. No. 2,914,596) teaches a method for fabricating lithiated nickel oxide air electrodes for use in high temperature fuel cells. U.S. Pat. No. 4,247,604 teaches molten carbonate anodes having stabilizing agents such as lithium salts. Although there are a variety of electrodes and methods of making them in the prior art, it is important to have electrodes that perform well and have the high strength which helps provide a fuel cell with a long life.

Accordingly, there is a constant search in this art for electrodes and methods of making them that result in electrodes having high strength so that the long life fuel cell necessary for successful commercial operation can be achieved.

DISCLOSURE OF INVENTION

This disclosure is directed to molten carbonate fuel cell cathodes that have improved strength. The molten carbonate fuel cell cathode is formed from a composition comprising oxides of nickel, lithium salts and barium salts.

Another aspect of this disclosure is methods for fabricating molten carbonate fuel cell cathodes that have improved strength. Oxides of nickel are prefired in an oxidizing atmosphere at temperatures of about 600° C. to about 1000° C. The prefired nickel oxides is formed into an electrode and sintered in an oxidizing atmosphere at about 850° C. to about 1250° C.

This invention makes a significant contribution to the molten carbonate fuel cell field by providing electrodes having higher strength. As a result, it advances the industry's quest for a long life fuel cell.

The foregoing and other features and advantages of the present invention will become more apparent from the following description and accompanying drawings.

BEST MODE FOR CARRYING OUT THE INVENTION

Figure 1:
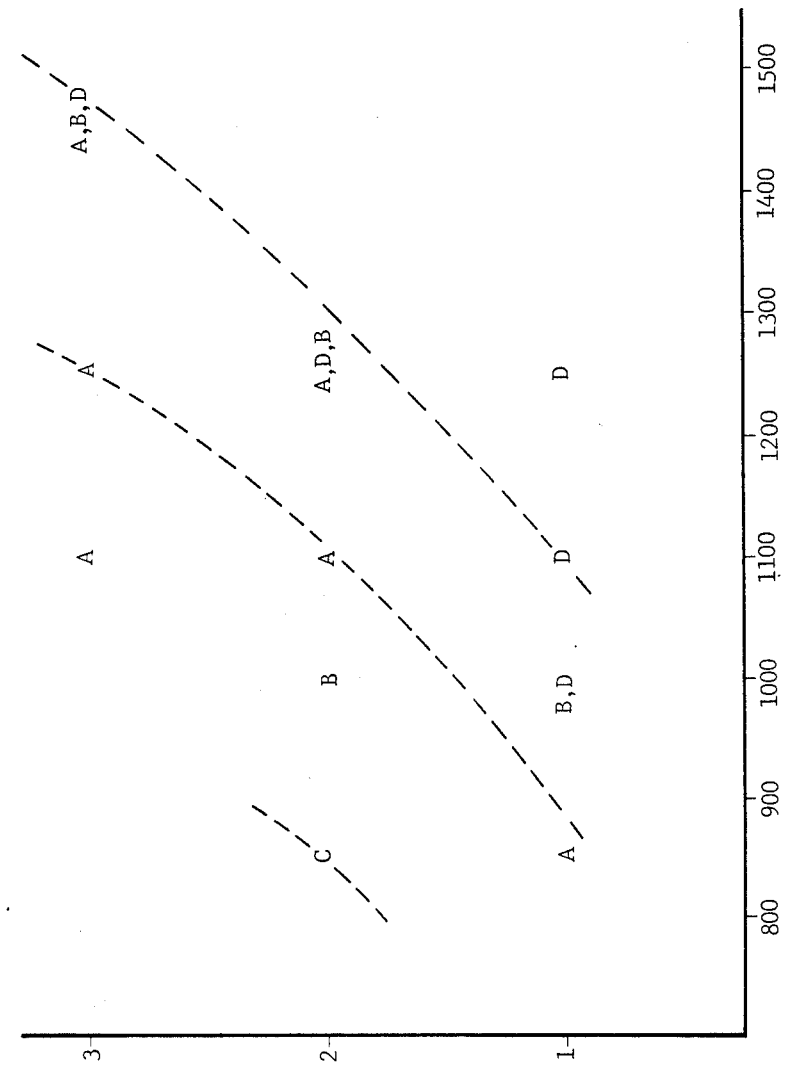
FIG. 1 is a graphical representation of strength as a function of sintering temperature for prefired and control (non-prefired) electrodes.

Both nickel oxides and copper oxides can be used in the practice of this invention as the electrode's major component. These oxides can result from precursor salts such as nickel nitrate and copper nitrate. It is preferred to use nickel oxide because of its reduced tendency to sinter at cell operating conditions as a result of its higher melting point. These powders are preferably about 2 microns ($\mu$) to about 50$\mu$ in diameter because these sizes produce the desired pore size distribution. Inco No. 123 nickel oxide which is available from International Nickel Corporation (Huntington, W. Va.) is an exemplary material. It is preferred that about 90 percent by weight (%) to about 100% of the major component of these electrodes is nickel oxide powder.

Stabilizing agents may be used in the practice of this invention. Stabilizing refers to the ability of the electrode to withstand its operating environment and maintain its porosity. Exemplary stabilizing agents include lithium salts and sodium salts. It is preferred to use lithium salts as the lithium cation is of a similar size to the nickel cation and this results in a solid solution of the two materials. It is especially preferred to use lithium carbonate, however, sulfates, nitrates and chlorides may also be used. Lithium carbonate is preferred as other salts can result in undesirable side products such as chlorine which can be pollutants. These powders are preferably less than about 44 in size because this size promotes the formation of a solid solution between the two materials. An exemplary material is reagent grade lithium carbonate available from Fischer Scientific Company (Pittsburgh, Pa.). These compounds act as stabilizers for the electrode material and it is preferred that they are present in an amount about 1% to about 10%. Below about 1%, the stabilizer is not present in sufficient amounts to alloy the nickel so that the resulting structure has good electronic conductivity during conventional cell operation temperatures (e.g. 600° C. to about 700° C.). When the stabilizer is present in amounts greater than about 10% phase separation occurs.

This method of fabricating electrodes can incorporate an organic acid leaching (wash) step. The organic acid utilized may be any of a variety of conventional organic acids known to those skilled in this art such as acetic acid or citric acid. It is preferred to use acetic acid as this is benign to the fuel cell structure. It is especially preferred that the acid wash comprises a solution of about 25% by volume to about 75% by volume of 99.7% glacial acetic acid and water. Acetic anhydride may be substituted for the water. Surprisingly, these organic acids result in stronger electrodes. It is believed they enhance the sintering behavior of the powders.

Preferably barium oxides are added to the electrodes of this invention as they result in stronger electrodes. The barium oxides can be incorporated into the electrode by heating the electrode powders with barium oxalates or other barium salts such as sulfates, nitrates and chlorides. Upon heating, it is believed the bariums salts are converted to barium oxide. It is preferable to use barium oxalate because many of the other salts are hydroscopic and give off noxious gases during decomposition. Barium salt powders are preferably about $10\mu$ to about $50\mu$ in size because the decomposition of the salt yields pores of the desired size. An exemplary material is reagent grade barium oxalate available from Aesor Chemical (Seabrook, N.H.). It is preferred that about 3% to about 10% barium salts are incorporated in the electrodes because these amounts increase the strength of the structure. Above about 10%, electrode conductivity decreases. Below about 3%, electrode strength is not significantly improved. It is especially preferred that about 5% barium oxalate is added to the composition because optimum strength and electrical properties are realized.

One method of fabricating these electrodes entails mixing the nickel oxides and optional lithium salts. The resulting well-mixed powder is then prefired. Another method comprises dissolving nickel salts and lithium salts in a suitable solvent followed by evaporation of the solvent yielding a mixture of nickel oxide and lithium salts which can be ground and prefired. It is preferable to prefire the powder at about 600° C. to about 1000° C. as temperatures above 1000° C typically evaporate off the lithium so that it is not incorporated into the as-formed electrode. It is preferred for the lithium to remain since its presence in the finished electrode is beneficial for the electrical conductance of the electrode. Temperatures below 600° C. can result in a weak electrode. This prefiring step results in a stronger electrode. This increased strength is surprising since prefiring is expected to result in larger nickel oxide crystallites. These larger crystallites should lead to a lower sintering rate during the electrode sintering stage which would be expected to yield a lower strength electrode. It is preferable to prefire the powders for about 6 hours to about 18 hours in an oxygen containing environment at atmospheric pressures.

It is optional but preferred to leach the prefired powder with an organic acid such as acetic acid to obtain the desired plate properties such as strength. This step was originally intended to remove any lithium oxide which did not alloy with the nickel oxide. Surprisingly, it was found that the leaching step increased the sintering behavior of the nickel oxide resulting in increased strength of the electrode. This would not be expected because lithium salts are known to those skilled in the art to increase sintering rates. Thus, their removal would be expected to result in lower sintering and decreased strength. In addition, it was also found that the sintering of nickel oxide powder which did not contain lithium salts increased after acid treatment.

Barium oxalate may be added to a prefired powder (which was optionally leached with an organic acid). Unexpectedly, barium oxalate addition permits lower forming pressures, lower electrode sintering temperatures and also results in a stronger electrode. This is surprising because it was thought barium might increase electrode porosity and thus decrease strength. It is believed that the increase in strength of the sintered electrode occurs because the barium oxalate acts as a lubricant during the forming cycle and decomposes to barium oxide during the electrode firing step. The barium oxide is believed to act as a sintering aid during the electrode firing step. The resulting powder is then fabricated into a green ceramic. This may be accomplished using, for example, a binder by conventional methods such as pressing, tape forming, slip casting or other ceramic forming techniques. The as formed electrodes may then be sintered in an oxidizing atmosphere at a temperature range of about 850° C. to about 1250° C. resulting in a strong electrode. It is especially preferred to sinter the preformed electrode at temperatures of about 800° C. to about 1000° C. because above these temperatures, lithium may evaporate from the electrode. The sintering duration is about 2 hours to about 16 hours at, for example, atmospheric pressures.

These sample electrodes typically have dimensions of about 3 centimeters (cm) in diameter by about 0.1 cm thickness. Their porosity is about 20% to about 60%. Of course their size and other parameters depend upon the fuel cell application but since they are stronger than electrodes formed from other methods, their advantages increase with the size of the fuel cell. These cathodes can be used in conventional molten carbonate fuel cells that are operated in conventional fashions. Although this disclosure has been directed towards molten carbonate fuel cell cathodes, these methods may also be used advantageously in the fabrication of electrodes for other purposes such as positive electrodes for nickel/hydrogen batteries and electrodes for alkali fuel cells.

EXAMPLE

Inco No. 123 nickel oxide powder (140 grams) and Fisher reagent grade lithium carbonate (5.5 grams) were mechanically mixed in a blender. The mixed powders were placed in an alumina crucible and prefired in air at 800° C. for 16 hours. The resultant cake was broken up and leached in a solution of 50% acetic acid and 50% water using equal volumes of powder and acetic acid solution. The powder was leached three times, each leach step followed by a distilled water rinse. The powder was then oven-dried at 70° C. 95 grams of the resultant powder was mixed with laboratory grade G-85 gum arabic binder available from Fisher Scientific Company (Pittsburgh, Pa.) (12 milliliters (ml.) with a concentration of 20 grams per litre) and 8 grams of hydrated barium oxalate. A wafer of the resultant mixture was pressed in a stainless steel die at 1000 psi (6.89 MPa) and sintered at 850° C. for four hours in an air atmosphere. The resultant structure had a porosity of 48%, a 3 cm diameter and good qualitative strength. Its properties are plotted as point D in the following graphs.

For given temperatures, these methods result in greater strength as described in FIG. 1. It is believed that this is a result of the prefiring step. In FIG. 1, electrode strength y is graphed against the electrode sintering temperature x. All samples were compacted at 4000 psi (27.6 MPa). Electrode strength is represented qualitatively by poor-1, moderate-2 and good-3 while sintering temperature is given in degrees centigrade. The points labeled (a) represent electrodes made using a prefiring step (650° C. to 800° C.). The points labeled (b), (c) and (d) represent electrodes made using a prefiring step (650° C. to 800° C.) plus an acid leach step, barium oxalate addition and control (neither prefired nor barium oxide addition) respectively. It is evident from these data that the prefiring step significantly affects the electrode strength for a given sintering temperature.

Figure 2:
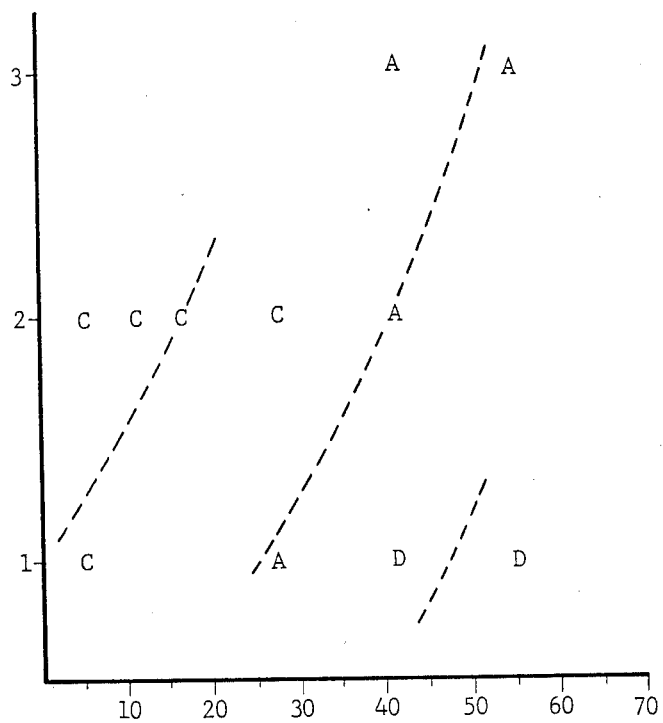
FIG. 2 is a graphical representation of strength as a function of compaction stress for electrodes with barium oxalate added and control (no barium oxalate) electrodes.

For a given electrode compaction stress, the electrodes made according to these methods have greater strength. It is believed that the barium oxide addition aids in achieving greater strength as depicted in FIG. 2. FIG. 2 graphs electrode strength y against compaction stress in megapascals x. Electrode strength is represented qualitatively by poor-1, moderate-2 and good-3. The points labeled (a), (c) and (d) represent electrodes made using prefired powder, barium oxalate addition and control (neither prefired or barium oxide addition) respectively. Prefiring was at 650° C. to 800° C. and all samples were sintered at 850° C. It is evident from this data that the prefiring step significantly affects the electrode strength for a given sintering temperature.

This invention provides methods for obtaining molten carbonate fuel cell cathodes that have improved strength over cathodes made from other processes for given sintering temperatures and compaction stresses. By allowing processing at lower temperatures and compaction stress energy is saved and in addition, the deleterious effects of high temperature are obviated. For example, temperatures above 1000° C. can result in the evaporation of lithium oxide so that it is not incorporated into the electrode. In addition, the lithium that is evaporated can become fused to the sintering reactor vessel walls resulting in contamination of future sintering work processed in that oven. The lower compaction stresses eliminate the extremely large impractical presses required to press large (e.g. one square meter) cathodes. By providing such electrodes, this invention makes a significant advance in the molten carbonate fuel cell field of technology.

It should be understood that the invention is not limited to the particular embodiment shown and described herein, but that various changes and modifications may be made without departing from the spirit or scope of this concept as defined by the following claims.

We claim:

1. A method of fabricating a molten carbonate fuel cell cathode comprising:
    (a) prefiring a composition comprising oxides of nickel and lithium salts in an oxidizing atmosphere at temperatures of about 600° C. to about 1000° C.;
    (b) mixing barium salts with said prefired composition;
    (c) forming said prefired composition into an electrode; and
    (d) sintering said electrode in an oxidizing atmosphere at about 850° C. to about 1250° C.;
wherein said electrode has improved strength.

2. The method of fabricating a molten carbonate fuel cell cathode of claim 1 wherein said prefired composition is leached with an organic acid prior to sintering said electrode.

* * * * *

UNITED STATES PATENT AND TRADEMARK OFFICE
CERTIFICATE OF CORRECTION

PATENT NO. : 4,800,052

DATED : January 24, 1989

INVENTOR(S) : Thomas E. Swarr and John C. Trocciola

It is certified that error appears in the above-identified patent and that said Letters Patent is hereby corrected as shown below:

On the Title Page, Item [62], "1986" should be --1985--.

Column 1, line 6, "1986" should be --1985--.

Signed and Sealed this

Twenty-fifth Day of July, 1989

Attest:

DONALD J. QUIGG

Attesting Officer

Commissioner of Patents and Trademarks